United States Patent
Brown et al.

(10) Patent No.: US 8,602,657 B2
(45) Date of Patent: Dec. 10, 2013

(54) CAGE FOR BEARING ASSEMBLY

(75) Inventors: Michael G. Brown, Laurens, SC (US); Gunter J. Zinken, Simpsonville, SC (US); Jean E. Kleis, legal representative, Simpsonville, SC (US)

(73) Assignee: Koyo Bearings USA LLC, Westlake, OH (US)

( * ) Notice: Subject to any disclaimer, the term of this patent is extended or adjusted under 35 U.S.C. 154(b) by 501 days.

(21) Appl. No.: 12/792,553

(22) Filed: Jun. 2, 2010

(65) Prior Publication Data
US 2010/0322549 A1  Dec. 23, 2010

Related U.S. Application Data

(60) Provisional application No. 61/186,997, filed on Jun. 15, 2009.

(51) Int. Cl.
*F16C 33/48* (2006.01)

(52) U.S. Cl.
USPC .......................................... 384/572; 384/623

(58) Field of Classification Search
USPC ......... 384/572, 575, 580, 584, 588, 618, 620, 384/623; 29/898.067
See application file for complete search history.

(56) References Cited

U.S. PATENT DOCUMENTS

| | | | | |
|---|---|---|---|---|
| 1,951,042 A | * | 3/1934 | Walter | 384/574 |
| 3,114,960 A | * | 12/1963 | Einaudi | 29/898.067 |
| 3,240,542 A | * | 3/1966 | Jahn | 384/623 |
| 5,232,290 A | * | 8/1993 | Buschle et al. | 384/584 |
| 5,391,005 A | * | 2/1995 | Alling | 384/572 |
| 6,561,945 B2 | | 5/2003 | Shattuck et al. | |
| 6,892,455 B1 | * | 5/2005 | Feest | 29/895.33 |
| 2006/0252596 A1 | | 11/2006 | Abarquez et al. | |

FOREIGN PATENT DOCUMENTS

| | | |
|---|---|---|
| DE | 1725627 | 7/1956 |
| DE | 1198623 | 8/1965 |
| DE | 1963209 | 6/1967 |
| DE | 4214987 | 11/1992 |

(Continued)

OTHER PUBLICATIONS

"Trends Regarding Needle Roller Bearings for Automatic Transmission Planetary Gears," by K. Chihara and T. Satou, Koyo Engineering Journal English Edition No. 168E, pp. 39-42 (2005).

(Continued)

*Primary Examiner* — Marcus Charles
(74) *Attorney, Agent, or Firm* — Nelson Mullins Riley & Scarborough, LLP

(57) ABSTRACT

A bearing cage defines an overall axial length and includes a first end portion defining a first contact surface extending at a radially-outermost diameter of the bearing cage a first axial contact length, and a second end portion spaced a distance from the first end portion and defining a second contact surface extending at the radially-outermost diameter of the bearing cage a second axial contact length. The bearing cage further includes a plurality of spanning members extending between the first and second end portions to define a spanning member axial contact length defined at the radially-outermost diameter of the bearing cage by at least one contact pad. The bearing cage produces a total contact ratio, defined as the ratio of the sum total of the first axial contact length, the second axial contact length, and the spanning member axial contact length to the overall axial length, of at least 0.380.

14 Claims, 9 Drawing Sheets

(56) References Cited

FOREIGN PATENT DOCUMENTS

| | | | |
|---|---|---|---|
| DE | 10223432 A1 * | 12/2003 | .............. F16C 33/46 |
| DE | 69627937 | 5/2004 | |
| DE | 102007057045 A1 * | 5/2009 | .............. F16C 19/44 |
| EP | 2098738 | 9/2009 | |
| GB | 919983 | 2/1963 | |
| JP | 7259865 | 10/1995 | |
| JP | 10115322 A * | 5/1998 | .............. F16C 33/46 |
| JP | 11082696 A * | 3/1999 | .............. F16H 57/04 |
| JP | 2003106336 A * | 4/2003 | .............. F16C 33/54 |
| JP | 2004011689 A * | 1/2004 | .............. F16C 33/46 |
| JP | 2004353809 | 12/2004 | |
| JP | 2005214390 A * | 8/2005 | .............. F16H 57/02 |
| JP | 2006170369 A * | 6/2006 | .............. F16C 33/54 |
| JP | 2008075791 | 4/2008 | |
| JP | 2008232280 A * | 10/2008 | .............. F16C 19/58 |
| JP | 2008261476 A * | 10/2008 | .............. F16C 19/30 |

OTHER PUBLICATIONS

Office Action dated Jun. 15, 2012 for co-pending German Patent Application No. 10 2010 023 746.9-12.

* cited by examiner

US 8,602,657 B2

CAGE FOR BEARING ASSEMBLY

CLAIM OF PRIORITY

This application claims priority to U.S. Provisional Application No. 61/186,997, filed Jun. 15, 2009, the entire disclosure of which is incorporated by reference herein.

FIELD OF THE INVENTION

The present invention relates to bearing cages, and more particularly to bearing cages with improved PV (Pressure× Velocity) capabilities.

BACKGROUND OF THE INVENTION

Bearings are commonly used whenever two contacting parts rotate with respect to one another, such as in automatic transmissions and planetary gear sets. During part assembly, handling individual rolling elements is cumbersome and time consuming. To combat these issues, rolling elements are installed into bearing cages to produce a lightweight, easy to manipulate assembly able to simplify rolling element installation and maintain equal rolling element spacing during part assembly and operation.

Once installed, normal operation of a planetary gear set causes a bearing assembly to rotate simultaneously with respect to the planetary gear axis and the carrier gear axis. Due to the mass of the bearing cage, the rotation results in large amounts of centripetal acceleration, and consequently, movement of the bearing cage radially outwardly to contact the inner surface of the bore in which it was received. As carrier speeds increase, the pressure of the outer surfaces of the cage contacting the inner surface of the respective bore similarly increases. Ultimately, the pressure forces, in addition to the added velocity, increase the PV (Pressure×Velocity) experienced by the bearing cage and may limit the bearing assembly's operating envelope.

SUMMARY OF THE INVENTION

The present invention relates generally to a bearing assembly for use in a transmission including at least one planetary gear set. The bearing assembly includes a bearing cage with increased outer surface area to produce a lower PV during normal operating conditions. Specific geometry, such as contact area, contact area placement, and the number of contact locations, is manipulated to more effectively decrease the PV experienced by the bearing cage. The bearing cage further includes the ability to have each rolling element loaded from the outside of the cage.

In one embodiment, the bearing cage may comprise a first end portion defining a first radially exterior contact surface defined at a radially-outermost diameter of the bearing cage and having a first axial contact length, a second end portion spaced a distance from the first end portion and defining a second radially exterior contact surface defined at the radially-outermost diameter of the bearing cage and having a second axial contact length, and a plurality of spanning members extending between the first and second end portions. Each spanning member defines a spanning member axial contact length $C_{span}$ defined at a radially-outermost diameter of the bearing cage by at least one contact pad on the spanning member. The sum total of the first axial contact length, the second axial contact length, and the spanning member axial contact length $C_{span}$ defines a total contact length $C_{total}$ where the ratio of the total contact length $C_{total}$ to the overall axial length $L_1$ is at least 0.380.

In another embodiment, the bearing cage comprises a first end portion, a second end portion spaced a distance from the first end portion to define an overall axial length $L_1$, and a plurality of spanning members extending between the first and second end portions. Each of the plurality of spanning members defines a pair of distal contact pads and at least one intermediate contact pad, and each contact pad is positioned at a radially-outermost diameter of the bearing cage.

In yet another embodiment, the bearing cage comprises a first end portion, a second end portion spaced a distance from the first end portion, and a plurality of spanning members extending between the first and second end portions to define a spanning member axial length $L_2$. Each spanning member defines a spanning member axial contact length $C_{span}$ defined at a radially-outermost diameter of the bearing cage by at least one contact pad on the spanning member and the ratio of the spanning member axial contact length $C_{span}$ to the spanning member axial length $L_2$ is at least 0.370.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
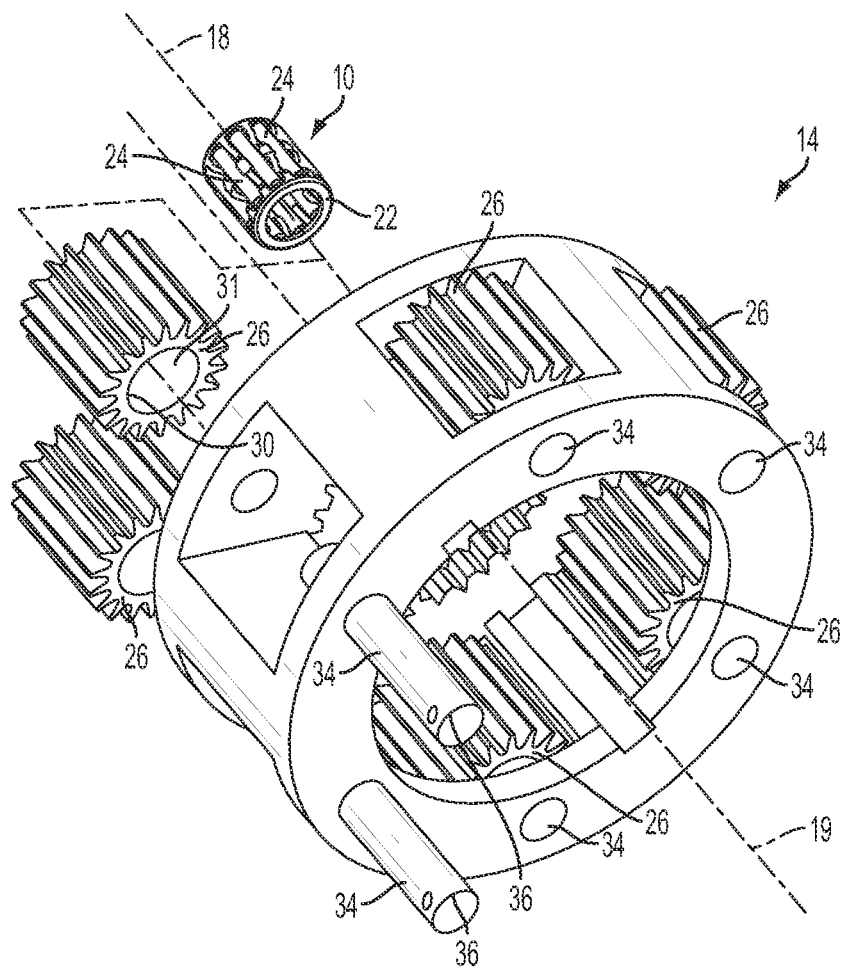
FIG. 1 is a perspective view of a planetary gear set having a bearing assembly embodying the present invention.
Figure 2:
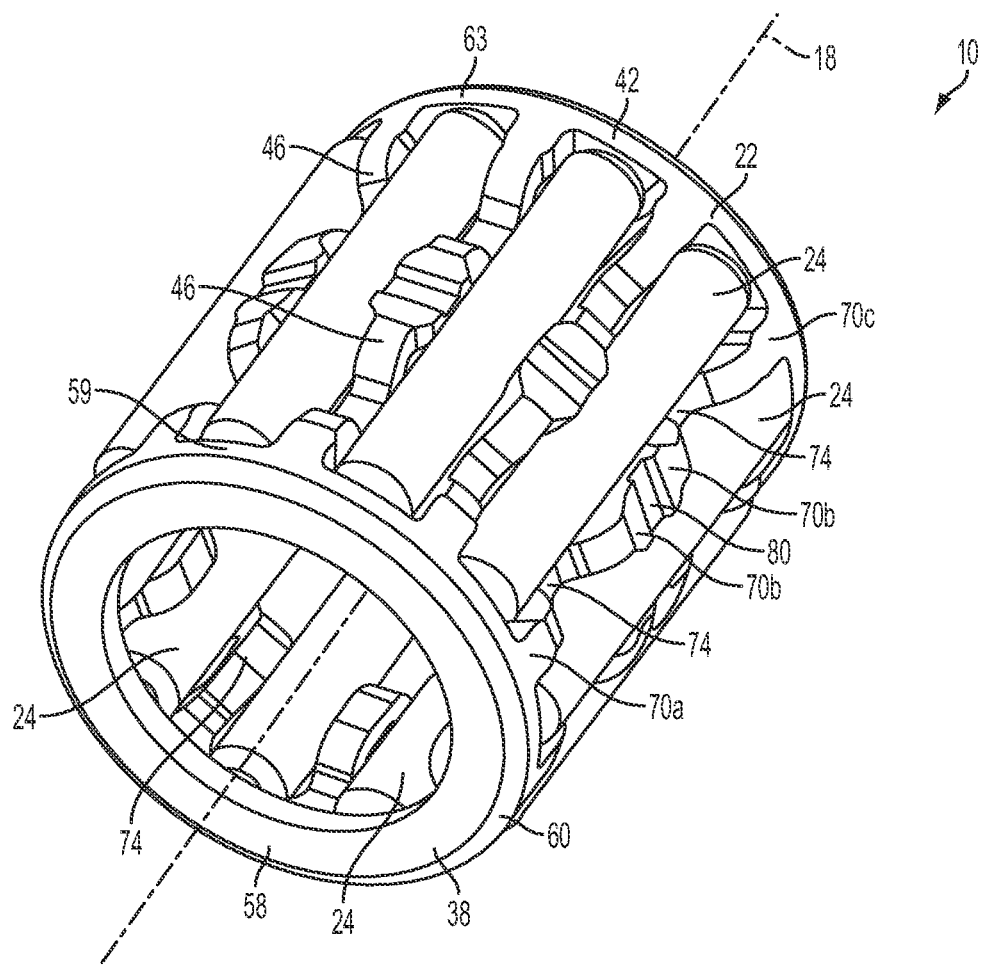
FIG. 2 is a perspective view of a bearing assembly of the planetary gear set of FIG. 1.

FIGS. 1 and 2 illustrate a bearing assembly 10 for use in an automatic transmission planetary gear set 14. However, one skilled in the art will understand that the bearing assembly 10 can also be used in other applications. The bearing assembly 10 includes a central axis 18, a bearing cage 22 coaxial with the central axis 18, and a plurality of rolling elements 24 (e.g., needle rollers) received by and rotatable with respect to the bearing cage 22. In the illustrated embodiment, the planetary gear set 14 includes one or more planetary gears 26, each including a central bore 30 shaped to receive the bearing assembly 10. The bearing assembly 10, in return, receives a gear axle 34, coaxial with the planetary gear 26 and the central axis 18. The bearing assembly 10 permits relative rotation of the planetary gear 26 with respect to the gear axle 34 while minimizing rotational friction therebetween. During normal operation, the plurality of rolling elements 24 contact both the inner surface 31 of the central bore 30 and the outer diameter 36 of the gear axle 34.

With reference to FIGS. 2-4a the bearing cage 22 receives each rolling element 24 and acts as a lightweight, easy to handle assembly during manufacturing, assembly, and operation of the planetary gear set 14. The bearing cage 22 receives each rolling element 24 from the outside and further maintains the rolling element 24 at a constant relative location with respect to all other rolling elements 24 within the cage 22. During normal operation of the planetary gear assembly 14, the bearing cage 22 does not restrict the rotation of the rolling elements 24.

The bearing cage 22 is substantially cylindrical and includes a first end portion 38 that is substantially annular and coaxial with the central axis 18, a second end portion 42 spaced a distance from the first end portion 38 and coaxial the central axis 18, and a plurality of spanning portions or members 46 extending axially between the first and second end portions 38, 42. During normal operation, the bearing cage 22 simultaneously rotates about both the central axis 18 and a carrier axis 19 generally located at the center of the planetary gear set 14. At normal transmission speeds, the bearing cage 22 is subject to centripetal acceleration able to potentially deform the cage 22. More specifically, the centripetal acceleration may result in the radially-outermost regions of the cage 22 expanding radially outwardly until contacting the inner surface 31 of the central bore 30. Any additional increase in the overall rotational speed of the planetary gear set 14 results in an increased force where the radially outer surfaces of the cage 22 contact the inner surface 31 of the central bore 30. Therefore, the PV experienced by a bearing cage 22 increases relative to the carrier speed.

With continued reference to FIGS. 2-4a, the first and second end portions 38, 42 define an outer diameter 50 (see FIG. 4) substantially corresponding to the diameter of the central bore 30 of the planetary gear 26. The first and second end portions 38, 42 include first and second surfaces 58, 62, respectively, extending radially inwardly at the outer diameter 50 to define an inner diameter 54 substantially corresponding to an outer diameter 36 of the gear axle 34. The first and second surfaces 58, 62 are substantially annular and perpendicular the central axis 18. The radial difference between the inner and outer diameters 50, 54 is equal to or less than the outer diameter of the plurality of rolling elements 24 (discussed below) when positioned in the cage. The first and second end portions 38, 42 may also define first and second radially exterior contact surfaces 59, 63 extending axially inwardly first and second axial contact lengths E1, E2 (see FIG. 4a) over at least a portion of the outer diameter 50. Moreover, the first and second end portions 38, 42 may include respective lead-in or chamfer surfaces 60, 64.

Each of the plurality of spanning members 46 extends axially between the first and second end portions 38, 42, while varying in diameter between the outer diameter 50 and at least one secondary diameter 66 to define one or more contact pads 70a, b, c and one or more intermediate spans 74. Each contact pad 70a, b, c may be defined as any segment of the spanning member 46 in position to potentially contact the central bore 30 during standard operation of the needle bearing cage assembly 10 (i.e., at the outer diameter 50). Each contact pad 70a, b, c is generally shaped and sized to maximize the contact area with the inner surface 31 of the central bore 30 for a given amount of axial length. More specifically, the contact pads 70a, b, c may be greater in width than the adjacent intermediate spans 74. In some specific embodiments, the bearing cage 22 has at least 20% of the maximum possible outer surface area in position to contact the inner surface 31 of the central bore 30. The maximum outer surface area is defined as the outer surface area ($SA_{max}=\pi DL$) of a solid cylindrical piece having an identical outer diameter D (i.e., outer diameter 50) and identical overall axial length L (i.e., axial length L1) of the specified bearing cage 22 (see FIGS. 4 and 4a).

Figure 7A:
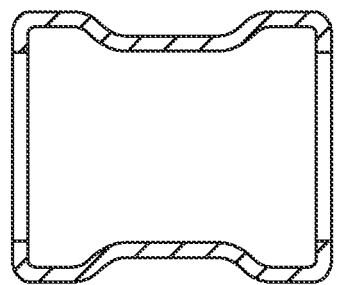
FIGS. 7a and 7b are section views of two prior art bearing cages.

With continued reference to FIGS. 2-4a, each spanning member 46 defines a plurality of contact pads 70a, b, c positioned between the first and second end portions 38, 42. More specifically, in the current embodiment each spanning member 46 defines a pair of distal contact pads 70a, c, adjacent first and second end portions 38, 42 respectively, and one or more intermediate contact pads 70b positioned between the distal contact pads. Preferably in embodiments utilizing a single intermediate contact pad 70b, the contact pad is axially centered along the length of its respective spanning member 46 to better distribute the pressure produced during normal operation and/or to minimize possible deformations of the bearing cage 22. However, in additional specific embodiments, each spanning member 46 may define a plurality of contact pads 70a, b, c at irregular positions along the axial length $L_2$ of the spanning member 46. In yet another embodiment, each spanning member 46 of a single bearing cage 22 may define a unique number and/or location of intermediate 70b and distal contact pads 70a, c from the other spanning members 46 of the same cage 22. In contrast, the prior art cages of FIGS. 7a, b, c fail to define any intermediate contact pads.

Figure 4:
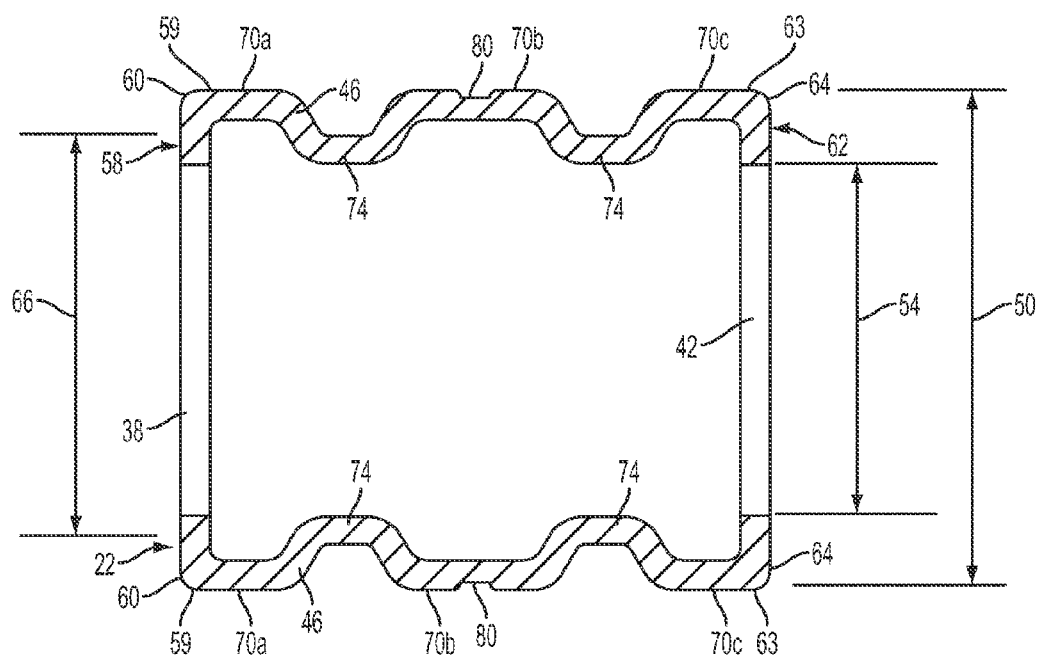
FIG. 4 is a cross sectional view taken along line 4-4 in FIG. 3.
Figure 4A:
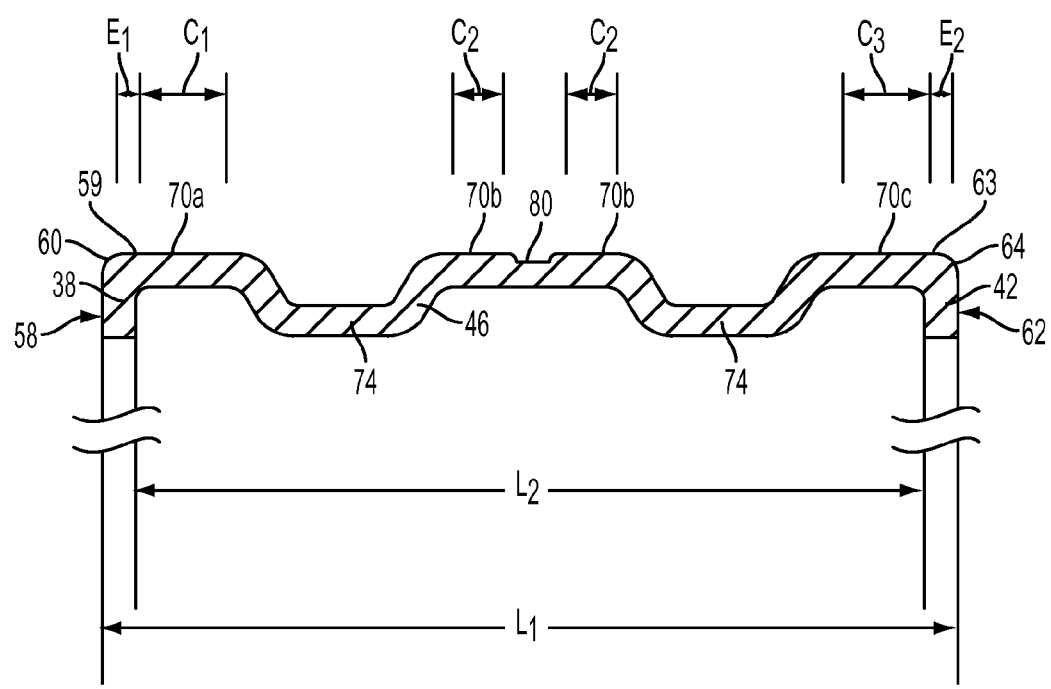
FIG. 4a is a section view showing a portion of FIG. 4.
Figure 5:
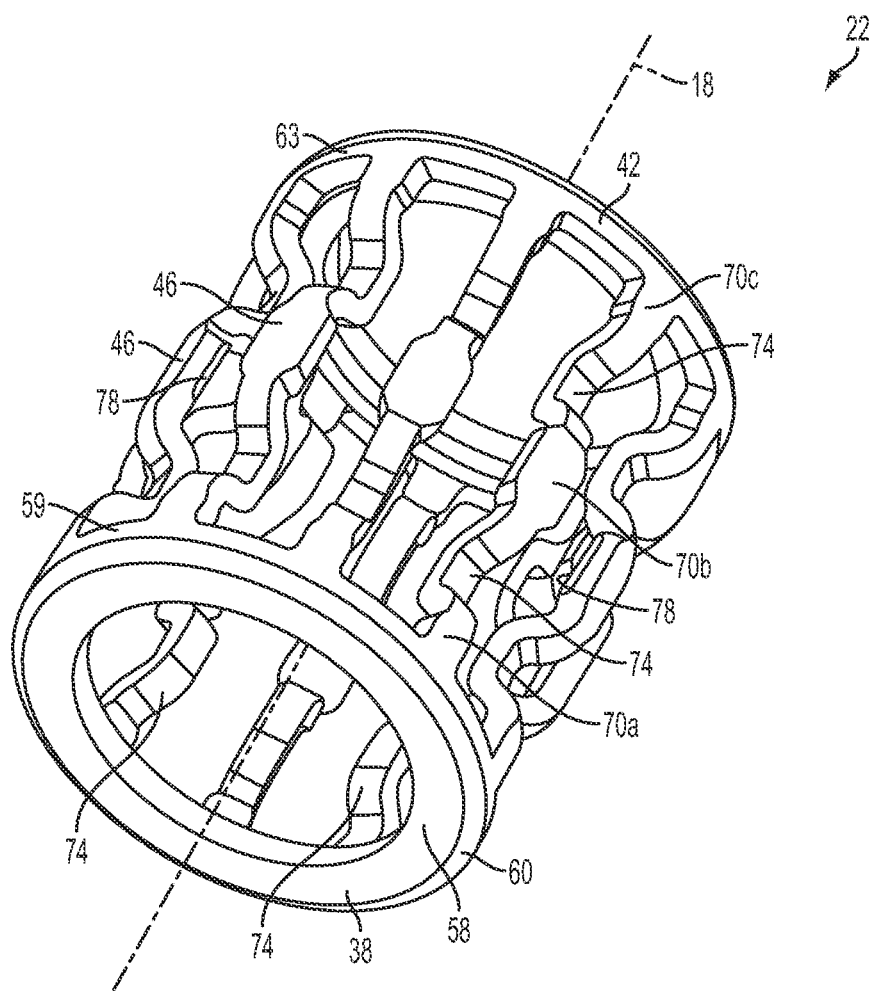
FIG. 5 is a perspective view of an alternate embodiment of the bearing cage of FIG. 3.
Figure 6:
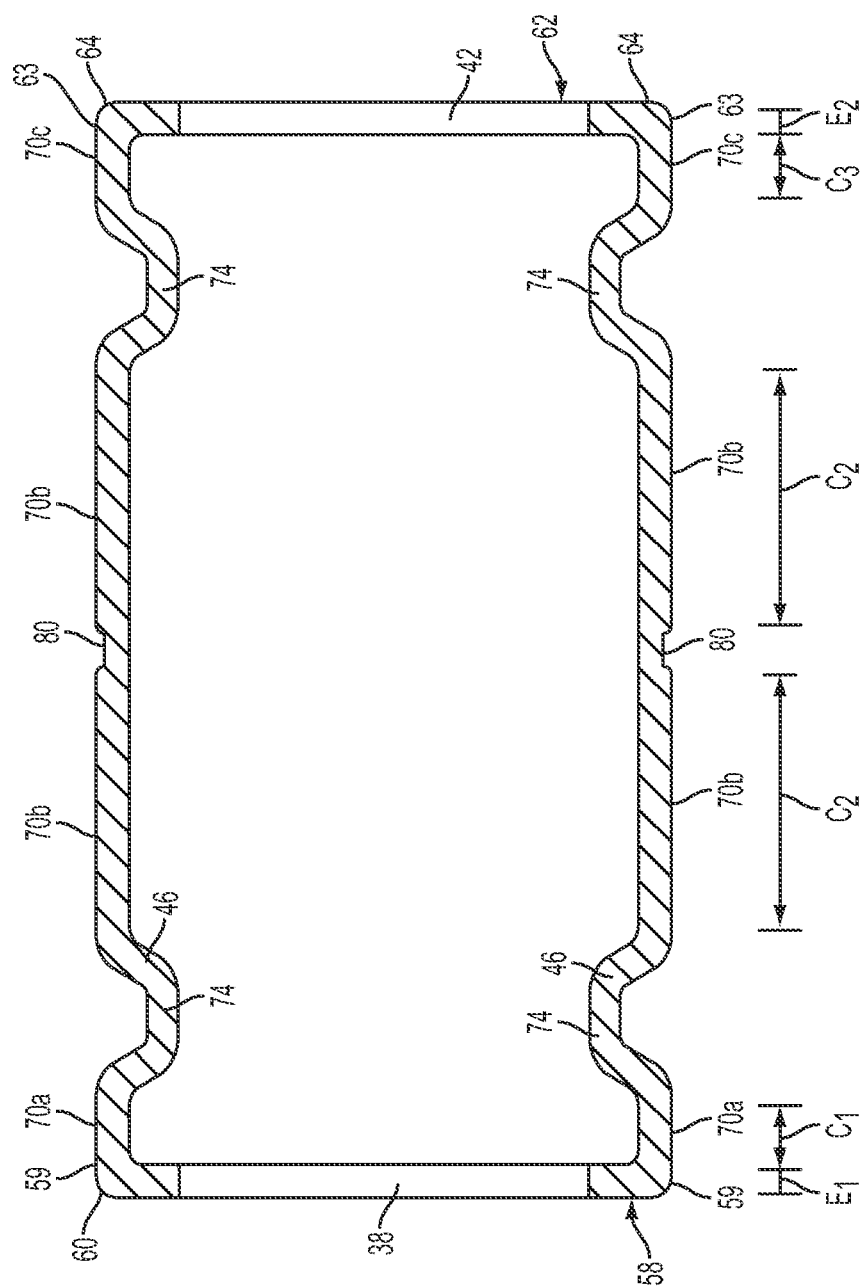
FIG. 6 is a section view of a second alternate embodiment of the bearing cage of FIG. 3.

In the illustrated construction of FIGS. 5 and 6, each intermediate contact pad 70b is generally larger in contact area (e.g., the amount of area contacting the inner surface 31 of the outer bore 30) and wider in contact geometry (e.g., the shape of the pad contacting the inner surface 31 of the outer bore 30) than the distal contact pads 70a, c. In alternate constructions, however, each contact pad 70a, b, c may define similar contact areas and/or specific contact geometries dependent upon the specific application of that particular embodiment (see FIGS. 2-4a). In yet another embodiment, each intermediate contact pad 70b, may be separated by a lubrication slot 80 (see FIG. 4a).

Each contact pad 70a, b, c of the bearing cage 22 may include one or more retention members 78 (see FIG. 3) positioned to receive and retain at least one rolling element 24. Each retention member 78 collaborates with at least one adjacent retention member 78 and preferably at least one intermediate span 74 to restrict the rolling element 24 from translating relative to the bearing cage 22. The retention member 78 allows the rolling element 24 to be loaded into the bearing cage 22 from the outside and, upon receiving at least a portion of the rolling element 24 being loaded into the cage 22, restricts removal.

In some specific embodiments, each retention member 78 is positioned to deflect upon introduction of the rolling element 24. More specifically, each retention member 78 may be positioned on one of the one or more intermediate contact pads 70b, spaced away from the end portions 38, 42, to promote deflection. Positioning the retention members 78 so that they may deflect upon introduction of a rolling element 24 allows the rolling elements 24 to be held with a tighter tolerance, thereby reducing the amount of deflection each rolling element 24 may exhibit with respect to the bearing cage 22 once the roller is retained. Reduced roller element deflection is desired in high volume installation applications which typically utilize automated machinery. In alternate external loading techniques, stationary retention members require larger tolerances with respect to the rolling elements, and as a result, permit larger rolling element deflection often resulting in the elements interfering with the central bore 30 and inhibiting the installation process. In the present invention, the retention members 78 facilitate automated assembly by minimizing rolling element deflection.

Figure 3:
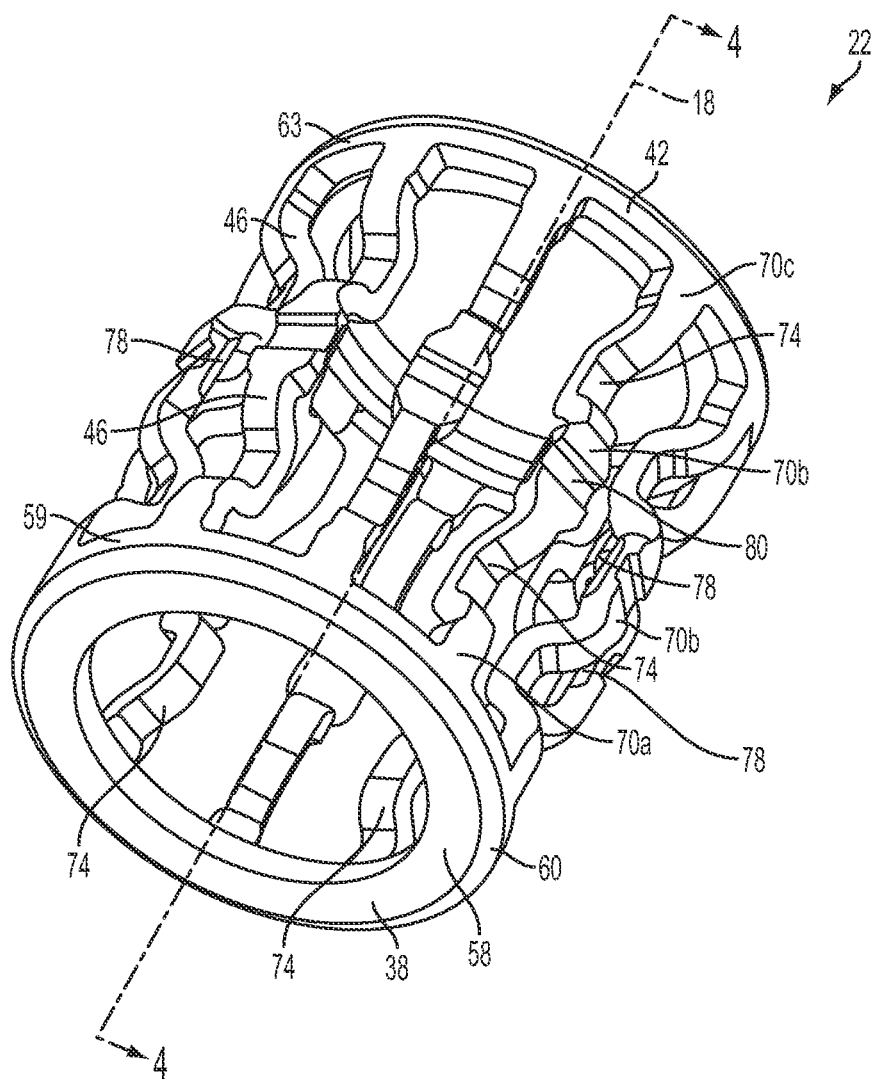
FIG. 3 is a perspective view of a bearing cage of the bearing assembly of FIG. 2.

As depicted in FIGS. 2-4$a$, each intermediate contact pad 70$b$ may be flanked by one or more lubrication slots 80. Each lubrication slot 80 is substantially open to the outer surface of the bearing cage 22, extending radially inwardly. The lubrication slot 80 extends tangential to the contact pad 70$b$ to facilitate the flow of lubrication between the inner wall 31 and the outer surface of the bearing cage 22. While shown only between the intermediate contact pads 70$b$, lubrication slots 80 may be included adjacent any contact pad 70$a$, $b$, $c$ and/or the first and second end portions 38, 42 to facilitate lubrication flow and/or relative rotation between the bearing assembly 10 and the planetary gear 26. The lubrication slots 80 may take on any shape and/or orientation to optimize the flow of lubrication (e.g., "X" shaped). Moreover, the bearing cage 22 may be void of any lubrication slots 80 (see FIG. 5) if permitted by the specific application in which the cage 22 is being utilized.

With continued reference to FIGS. 3 and 4, each intermediate span 74 of the one or more intermediate spans may be defined as any portion of the spanning member 46 having its radially-outermost surface positioned at the one or more secondary diameters 66 (e.g., less than the outer diameter 50). The intermediate spans 74 are substantially "U" shaped and define an inner radial threshold in addition to acting as lateral guide for maintaining the location of each rolling element 24. In the current construction, each intermediate span 74 extends a substantially equal length and is flanked by a pair of contact pads; however, in alternate embodiments, each spanning member 46 may define intermediate spans 74 with unique lengths between the first and second end portions 38, 42.

In particular constructions, the spanning members 46 define a sufficient size and/or quantity of contact pads 70$a$, $b$, $c$ such that no individual intermediate span 74 extends longer than about 15-29% of the overall spanning length L$_2$ (shown in FIG. 4$a$). In additional preferred embodiments, no individual intermediate span 74 extends longer than about 14-23% of the total axial length L$_1$ of the bearing cage 22 to reduce possible deformation and minimize possible PV experienced by of the bearing cage 22. In yet another particular embodiment, the intermediate spans 74 remain constant in axial length as the overall length (L1) of the bearing cage 22 is increased. In such an embodiment, any increase in axial length (L1) of the bearing cage 22 may occur only in the one or more intermediate contact pads 70$b$ (see FIG. 6).

Figure 7B:
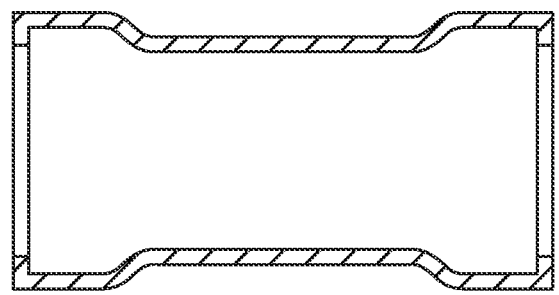
Figure 7C:
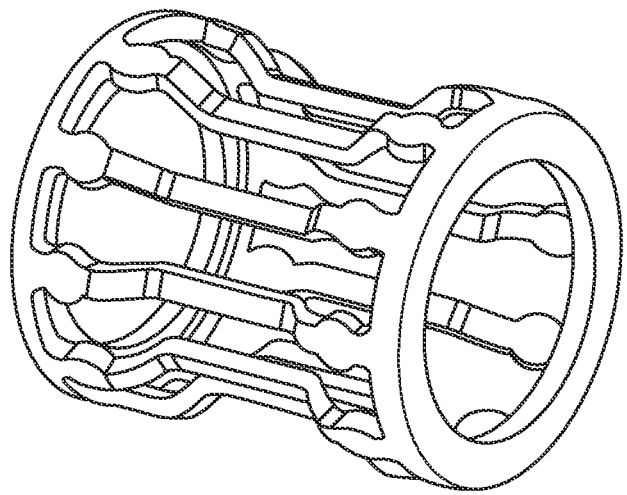
FIG. 7c is a perspective view of another prior art bearing cage.

With reference to FIG. 4$a$, each spanning member 46 of the plurality of spanning members defines an axial length L$_2$, and each contact pad 70$a$, $b$, $c$ of the plurality of contact pads defines axial contact lengths C1, C2, C3, respectively. Summing the contact pad axial contact lengths $C_1$, $C_2$, $C_3$ defines an overall spanning member contact length $C_{span}$. The axial length L$_2$ and overall spanning member contact length $C_{span}$ may then be compared to produce a spanning member contact ratio ($C_{span}/L_2$). The spanning member contact ratio helps display the ability of the bearing cage 22 to reduce the PV during operating conditions. A higher spanning member contact ratio generally relates to a higher amount of contact area with the inner surface 31 of the central bore 30 and a lower PV. In specific PV reducing constructions, each spanning member produces a spanning member contact ratio ($C_{span}/L_2$) ranging from about 0.338 to about 0.621. However, in some specific embodiments, the spanning member contact ratio may be larger than 0.370. In contrast, the prior art cages of FIGS. 7$a$, $b$, $c$, produce a spanning member contact ratio of only about 0.314 to about 0.357.

In addition to determining the spanning member contact ratio ($C_{span}/L_2$), an overall contact ratio may be calculated for the bearing cage 22. With reference to FIG. 4$a$, the outer radial contact surfaces 59, 63 define first and second axial contact lengths $E_1$, $E_2$ at the outer diameter 50, respectively. The first and second axial contact lengths $E_1$, $E_2$ are added to the overall spanning member contact length $C_{span}$ to produce a total contact length ($E_1+E_2 C_{span}=C_{total}$). The ratio of total contact length $C_{total}$ to overall axial length L$_1$ of the bearing cage 22, defines an overall contact ratio ($C_{total}/L_1$). In specific PV reducing total, constructions, each bearing cage 22 produces an overall contact ratio ranging from about 0.351 to about 0.611. In some particular embodiments, the contact ratio may be larger than about 0.380. In contrast, the prior art cage of FIGS. 7$a$, $b$, $c$, produce an overall contact ratio of only about 0.324 to about 0.369.

In the illustrated embodiment, the bearing cage 22 is generally formed from a wrap and weld technique well known in the art. However, in alternate embodiments, any construction technique known to one skilled in the art may be utilized to create the above described bearing cage 22. Moreover, the above described bearing cage 22 may be adapted to receive any number of rolling element types and/or variations such as balls, tapered rollers, and the like, and can be used in a variety of bearing applications.

With reference to FIG. 2, the bearing assembly 10 contains a plurality of rolling elements 24. Each rolling element 24 of the plurality of rolling elements is substantially cylindrical, and extends an axial length less than the overall axial length L$_1$ (see FIG. 4$a$) of the bearing cage 22. During assembly, each rolling element 24 is loaded radially inwardly into the bearing cage 22 from the outside (e.g., introduced through the outer diameter 50). While being loaded, each rolling element 24 engages and deflects at least one retention member 78 until at least a portion of the rolling element 24 is received and subsequently retained by the bearing cage 22 between adjacent spanning members 46. Loading from the outside is easier, and therefore reduces the time and cost of assembly, more specifically in embodiments where the shaft 34 outer diameter to rolling element 24 outer diameter ratio is less than 1:3. Once all rolling elements 24 have been loaded into the cage 22, the entire bearing assembly 10 may be installed between two relatively rotating entities, such as the planetary gear 26 and the gear axle 34.

Various features of the invention are set forth in the following claims.

What is claimed is:
1. A bearing cage having an overall axial length L$_1$, the bearing cage comprising:
a first end portion, defining a first radially exterior contact surface defined at a radially-outermost diameter of the bearing cage and having a first axial contact length;
a second end portion, spaced a distance from the first end portion and defining a second radially exterior contact surface defined at a radially-outermost diameter of the bearing cage and having a second axial contact length; and a plurality of spanning members extending between the first and second end portions, wherein each spanning member defines a spanning member axial contact length $C_{span}$ defined at a radially-outermost diameter of the bearing cage by a pair of distal contact pads and at least one intermediate contact pad disposed therebetween on the spanning member, wherein the at least one intermediate contact pad is wider than either of the pair of distal contact pads, wherein the sum total of the first axial contact length, the second axial contact length, and the spanning member axial contact length $C_{span}$ defines a total contact length $C_{total}$, and wherein the ratio of the total contact length $C_{total}$ to the overall axial length $L_1$ is at least 0.380.

2. The bearing cage of claim 1, wherein the spanning member axial contact length $C_{span}$ is defined by a sum total of the pair of distal contact pad lengths and a single intermediate contact pad length.

3. The bearing cage of claim 1, wherein each of the plurality of spanning members defines a spanning member axial length $L_2$, and wherein the ratio of the spanning member axial contact length $C_{span}$ to the spanning member axial length $L_2$ is at least 0.370.

4. The bearing cage of claim 3, wherein the ratio of the spanning member axial contact length $C_{span}$ to the spanning member axial length $L_2$ is about 0.370 to about 0.621.

5. The bearing cage of claim 1, wherein there is one intermediate contact pad substantially axially centered along the spanning member.

6. The bearing cage of claim 1, wherein there are two intermediate contact pads.

7. The bearing cage of claim 1, wherein the spanning member includes a lubrication slot.

8. The bearing cage of claim 1, wherein the bearing cage further includes one or more retention members.

9. The bearing cage of claim 8, wherein each of the one or more retention members are positioned to deflect upon introduction of a rolling element.

10. The bearing cage of claim 8, wherein each of the plurality of retention members deflect upon loading the rolling element from the outside of the bearing cage radially inwardly.

11. A bearing cage comprising:
first end portion;
a second end portion, spaced a distance from the first end portion to define an overall axial length $L_1$; and
a plurality of spanning members extending between the first and second end portions, wherein each of the plurality of spanning members defines a pair of distal contact pads and at least one intermediate contact pad, wherein the at least one intermediate contact pad is wider than either of the pair of distal contact pads, and wherein each contact pad is positioned at a radially-outermost diameter of the bearing cage.

12. The bearing cage of claim 11, wherein the first end portion defines a first radially exterior contact surface positioned at a radially-outermost diameter of the bearing cage extending a first axial contact length, wherein the second end portion defines a second radially exterior contact surface positioned at a radially-outermost diameter of the bearing cage extending a second axial contact length, wherein each spanning member defines a spanning member axial contact length $C_{span}$ defined by the pair of distal contact pads and the at least one intermediate contact pad, wherein the bearing cage defines a total contact length $C_{total}$ defined as the sum total of the first axial contact length, the second axial contact length, and the spanning member axial contact length $C_{span}$, and wherein the ratio of the total contact length $C_{total}$ to the overall axial length $L_1$ is at least 0.351.

13. The bearing cage of claim 11, wherein each of the plurality of spanning members defines a spanning member axial length $L_2$ and a spanning member axial contact length $C_{span}$ defined by the pair of distal contact pads and the at least one intermediate contact pad, and wherein the ratio of the spanning member axial contact length $C_{span}$ to the spanning member axial length $L_2$ is at least 0.338.

14. A bearing cage comprising:
a first end portion;
a second end portion, spaced a distance from the first end portion; and
a plurality of spanning members extending between the first and second end portions to define a spanning member axial length $L_2$, wherein each spanning member defines a spanning member axial contact length $C_{span}$ defined at a radially-outermost diameter of the bearing cage by a pair of distal contact pads and at least one intermediate contact pad disposed therebetween on the spanning member,
wherein the at least one intermediate contact pad is wider than either of the pair of distal contact pads, and
wherein the ratio of the spanning member axial contact length $C_{span}$ to the spanning member axial length $L_2$ is at least 0.370.

* * * * *